United States Patent
Hirokawa et al.

(10) Patent No.: US 9,274,776 B2
(45) Date of Patent: Mar. 1, 2016

(54) PRODUCT, METHOD, AND APPARATUS FOR INSTALLING A SECOND PROGRAM BASED ON A CALL FROM A FIRST PROGRAM

(75) Inventors: Tomoya Hirokawa, Kanagawa (JP); Yuuko Sugiura, Tokyo (JP); Xiaofeng Han, Kanagawa (JP); Taku Ikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/820,348

(22) PCT Filed: Sep. 7, 2011

(86) PCT No.: PCT/JP2011/070910
§ 371 (c)(1),
(2), (4) Date: Mar. 1, 2013

(87) PCT Pub. No.: WO2012/036174
PCT Pub. Date: Mar. 22, 2012

(65) Prior Publication Data
US 2013/0174141 A1    Jul. 4, 2013

(30) Foreign Application Priority Data
Sep. 16, 2010    (JP) .................... 2010-208213

(51) Int. Cl.
*G06F 9/445*    (2006.01)

(52) U.S. Cl.
CPC ... *G06F 8/61* (2013.01); *G06F 8/62* (2013.01)

(58) Field of Classification Search
None
See application file for complete search history.

(56) References Cited

U.S. PATENT DOCUMENTS

| | | | |
|---|---|---|---|
| 5,721,824 A * | 2/1998 | Taylor | 709/203 |
| 6,349,408 B1 | 2/2002 | Smith | |
| 2004/0060045 A1 | 3/2004 | Hind et al. | |
| 2005/0193388 A1 * | 9/2005 | Hayes | 717/174 |
| 2005/0193389 A1 | 9/2005 | Murphy et al. | |
| 2005/0226641 A1 | 10/2005 | Ando et al. | |
| 2007/0008583 A1 | 1/2007 | Araki | |
| 2007/0064892 A1 | 3/2007 | Ando | |
| 2007/0124510 A1 | 5/2007 | Ando | |
| 2007/0174833 A1 * | 7/2007 | Im | 717/174 |
| 2007/0201655 A1 * | 8/2007 | Shenfield | 379/201.01 |
| 2008/0320465 A1 | 12/2008 | Kinder et al. | |
| 2009/0172657 A1 * | 7/2009 | Makelainen et al. | 717/174 |
| 2009/0249328 A1 * | 10/2009 | Wetherell et al. | 717/175 |
| 2010/0005481 A1 * | 1/2010 | Lewis et al. | 719/320 |

(Continued)

FOREIGN PATENT DOCUMENTS

| | | |
|---|---|---|
| GB | 2466220 A | 6/2010 |
| JP | 2000-029713 | 1/2000 |

(Continued)

OTHER PUBLICATIONS

Hall et al., Evaluating software deployment languages and schem: an experience report, International Conference on Software Maintenance, Nov. 16-20, 1998, pp. 177-185.*

(Continued)

*Primary Examiner* — Anil Khatri
*Assistant Examiner* — Timothy Duncan
(74) *Attorney, Agent, or Firm* — IPUSA, PLLC

(57) ABSTRACT

An install method executed by an apparatus, including receiving a call from a first program when the first program is activated; and installing a second program that is used by the first program, in response to the call.

13 Claims, 11 Drawing Sheets

(56) References Cited

U.S. PATENT DOCUMENTS

| | | | |
|---|---|---|---|
| 2010/0058482 A1 | 3/2010 | Nagumo et al. | |
| 2010/0071069 A1 | 3/2010 | Sugiura et al. | |
| 2010/0306759 A1* | 12/2010 | Kohler et al. | 717/174 |
| 2011/0041125 A1 | 2/2011 | Sugiura | |
| 2011/0055825 A1 | 3/2011 | Ikawa | |
| 2011/0066886 A1 | 3/2011 | Sugiura et al. | |
| 2011/0066972 A1 | 3/2011 | Sugiura | |
| 2011/0067117 A1 | 3/2011 | Nagumo et al. | |
| 2011/0271273 A1* | 11/2011 | Dumais et al. | 717/175 |
| 2011/0288932 A1* | 11/2011 | Marks et al. | 705/14.49 |

FOREIGN PATENT DOCUMENTS

| | | |
|---|---|---|
| JP | 2004-118237 | 4/2004 |
| JP | 2005-269619 | 9/2005 |
| JP | 2006-271005 | 10/2006 |
| JP | 2006-311590 | 11/2006 |
| JP | 2007-048270 | 2/2007 |
| JP | 2007-049677 | 2/2007 |
| JP | 2007-109218 | 4/2007 |
| JP | 2007-109219 | 4/2007 |
| JP | 2007-279959 | 10/2007 |
| JP | 2008507775 | 3/2008 |
| WO | 2006012533 | 2/2006 |

OTHER PUBLICATIONS

Extended European search report dated Feb. 26, 2014.

Japanese Office Action dated Jul. 15, 2014.

* cited by examiner

FIG.10

| MODEL NAME | APPLICATION IDENTIFIER | CSDK FILE NAME |
|---|---|---|
| aaaa001 | aaaa | csdk_app001 |
| aaaa002 | aaaa | csdk_app002 |
| bbbb001 | bbbb | csdk_app003 |
| .. | .. | .. |

PRODUCT, METHOD, AND APPARATUS FOR INSTALLING A SECOND PROGRAM BASED ON A CALL FROM A FIRST PROGRAM

TECHNICAL FIELD

The present invention relates to an install method and an apparatus, and more particularly to an install method and an apparatus for executing programs in the apparatus.

BACKGROUND ART

Conventionally, there are image forming apparatuses to which application programs can be added as plug-ins after shipment. For example, applications developed in C language (hereinafter, "C applications") and applications developed in Java (registered trademark) (hereinafter, "J applications") can be installed in the image forming apparatus described in patent document 1.

However, the platform for C applications and the platform for J applications are different. Specifically, the platform for J applications is formed by providing, on a platform for C applications, a platform provided with API (Application Program Interface) for Java (registered trademark) (the JSDK platform in patent document 1).

The model dependence of the JSDK platform is significantly lower than that of the platform for C applications. That is to say, the API of the JSDK platform is leveled out to be applicable to various model types. From the viewpoint of the developer of applications, it is more advantageous to develop applications as J applications. This is because in the case of J applications, the necessity of changing source codes for respective model types is low, and therefore development costs can be reduced.

However, the function range of API provided by JSDK platforms is narrower than that of platforms for C applications. That is to say, the number of functions that can be implemented by genuine J applications is less than that of genuine C applications. A genuine J application means a J application that is configured with only program modules that operate on a JSDK platform.

Thus, if a function cannot be implemented only by a J application, the function needs to be installed as a C application. In this case, a package including both a J application module and a C application module is sold as one application.

An application including both a J application and a C application may appear to be a single application to the user, but this application is perceived as two applications by an image forming apparatus that cannot recognize an application having such a configuration (i.e., a configuration including both a J application and a C application). Thus, the user needs to perform an install operation two times (the user needs to give an instruction to execute an install operation two times).

In such an image forming apparatus, by correcting the install mechanism of applications in consideration of applications having the above configuration, it is technically possible to execute both a process of installing a J application and a process of installing a C application by a single install instruction.

However, image forming apparatuses that cannot recognize an application including both a J application and a C application are already vastly commercially available and are being used by end users. It would require large amounts of cost and work to apply the above-described corrections to these image forming apparatuses.

Patent Document 1: Japanese Laid-Open Patent Application No. 2007-49677

DISCLOSURE OF INVENTION

The present invention has been made in view of the above-described problems, and it is an object of at least one embodiment of the present invention to provide an install method and an apparatus with which operations of installing programs can be simplified.

An aspect of the present invention provides a non-transitory computer-readable storage medium with an executable install program stored therein, wherein the install program instructs a processor of an apparatus to execute receiving a call from a first program when the first program is activated; and installing a second program that is used by the first program, in response to the call.

An aspect of the present invention provides an install method executed by an apparatus, the install method including receiving a call from a first program when the first program is activated; and installing a second program that is used by the first program, in response to the call.

An aspect of the present invention provides an apparatus including a receiving unit configured to receive a call from a first program when the first program is activated; and a first installing unit configured to install a second program that is used by the first program, in response to the call.

BRIEF DESCRIPTION OF DRAWINGS

FIG. 10 indicates an example of information recorded in a proxy attribute file.

BEST MODE FOR CARRYING OUT THE INVENTION

Figure 1:
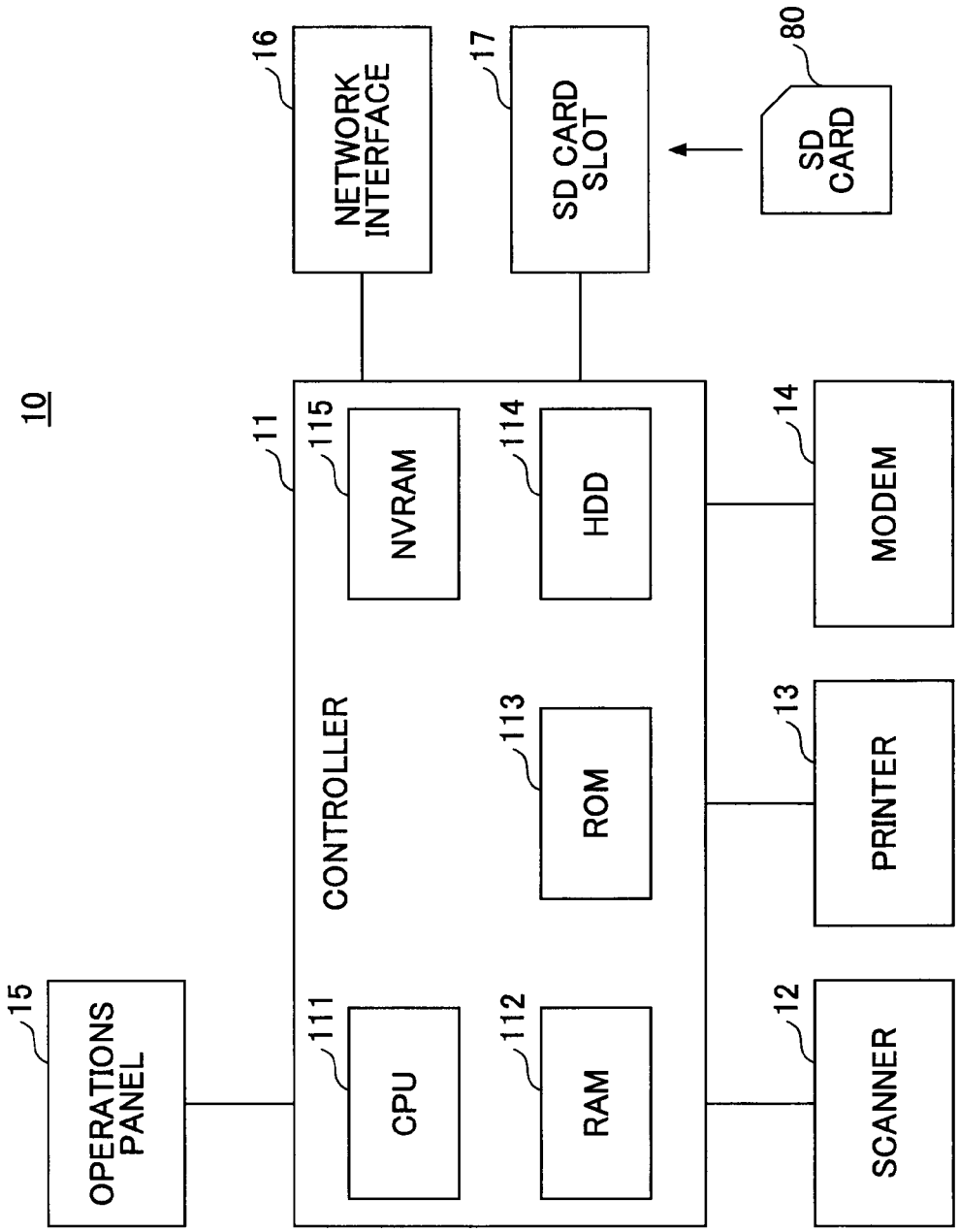
FIG. 1 illustrates an example of a hardware configuration of an image forming apparatus according to an embodiment of the present invention.

Embodiments of the present invention are described below with reference to the accompanying drawings. FIG. 1 illustrates an example of a hardware configuration of an image forming apparatus 10 according to an embodiment of the present invention. As shown in FIG. 1, the image forming apparatus 10 includes hardware elements such as a controller 11, a scanner 12, a printer 13, a modem 14, an operations panel 15, a network interface 16, and an SD card slot 17.

The controller 11 includes a CPU 111, a RAM 112, a ROM 113, a HDD 114 and an NVRAM 115. The ROM 113 records various programs and data used by the programs. The RAM 112 is used as a storage area for loading programs and a work area for the loaded programs. The CPU 111 processes the programs loaded in the RAM 112 to implement various functions. The HDD 114 records programs and various data items used by the programs. The NVRAM 115 records various setting information items.

The scanner 12 is a hardware element for scanning an original to obtain image data (image scanning unit). The printer 13 is a hardware element for printing data onto a sheet (printing unit). The modem 14 is a hardware element for connecting the image forming apparatus 10 to a telephone line to transmit and receive image data by fax communications. The operations panel 15 is a hardware element including an input unit such as a buttons for receiving input from a user, and a display unit such as a liquid crystal panel. The network interface 16 is a hardware element for connecting the image forming apparatus 10 to a network (wired or wireless) such as LAN. The SD card slot 17 is used for reading programs recorded in an SD card 80. In the image forming apparatus 10, in addition to programs recorded in the ROM 113, programs recorded in the SD card 80 may also be loaded and executed in the RAM 112.

Figure 2:
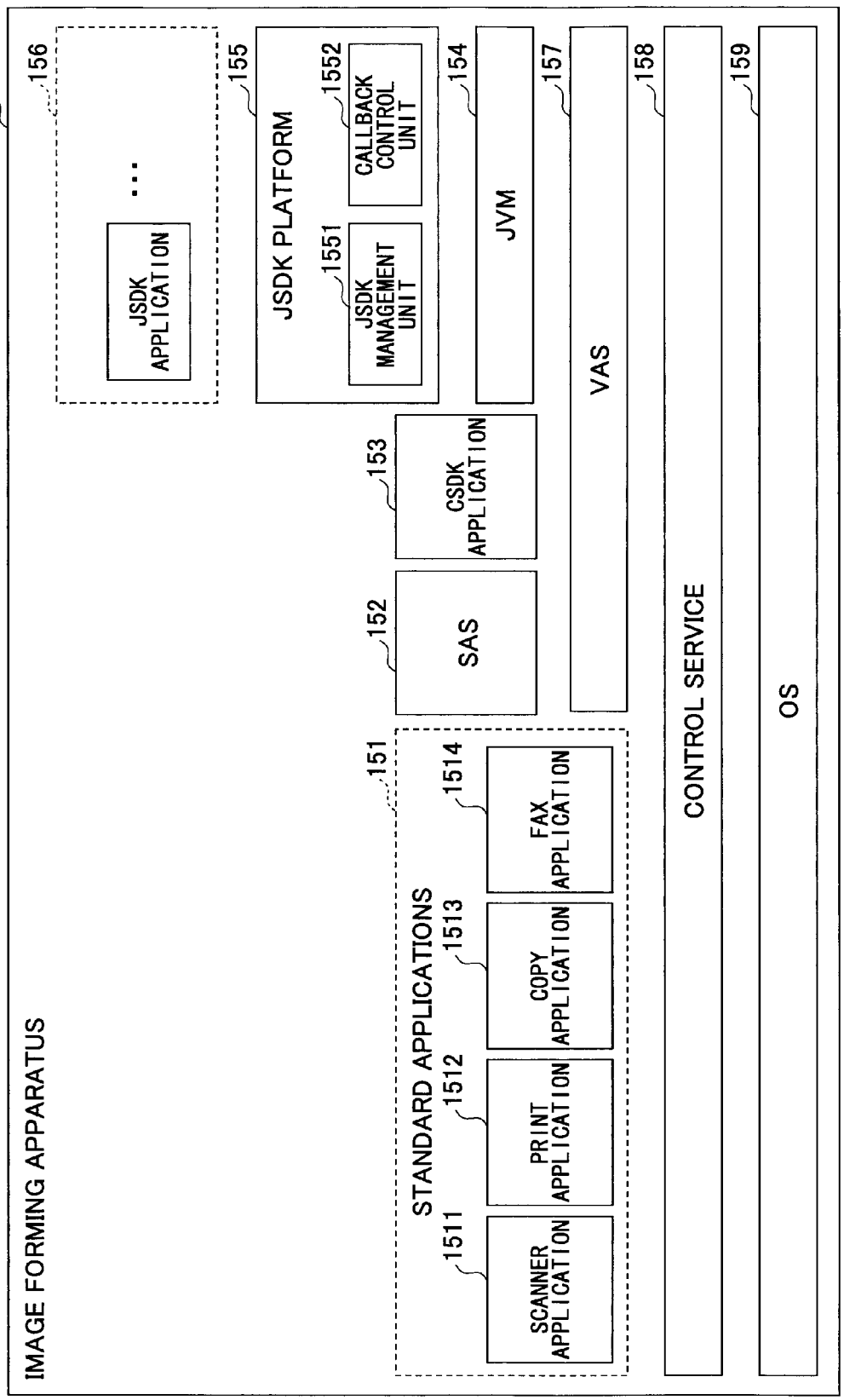
FIG. 2 illustrates a software configuration of the image forming apparatus according to an embodiment of the present invention.

FIG. 2 illustrates a software configuration of the image forming apparatus 10 according to an embodiment of the present invention. As shown in FIG. 2, the image forming apparatus 10 includes standard applications 151, SAS (SDK application service) 152, a CSDK application 153, JVM 154, a JSDK platform 155, JSDK applications 156, a VAS (Virtual Application Service) 157, a control service 158, and an OS 159.

The standard applications 151 are an assembly of applications that are installed as standard applications (with which the image forming apparatus 10 is shipped) in the image forming apparatus 10. Examples shown in FIG. 2 are a scanner application 1511, a print application 1512, a copy application 1513, and a FAX application 1514. The scanner application 1511 executes scan jobs. The print application 1512 executes print jobs. The copy application 1513 executes copy jobs. The FAX application 1514 executes fax transmission jobs or fax reception jobs.

The control service 158 is a group of software modules for providing functions for controlling various hardware resources to upper-level applications, and executing basic functions of the image forming apparatus 10.

The VAS 157 is for wrapping the interface of the control service 158, and for absorbing the difference in the interface that arises as the control service 158 is upgraded. This ensures that programs operated on the VAS 157 (particularly the CSDK application 153) are compatible with various versions of the control service 158.

The CSDK application 153 and the JSDK application 156 are examples of SDK applications. An SDK application is developed as a plug-in to the image forming apparatus 10 for the purpose of expanding functions of the image forming apparatus 10. The image forming apparatus 10 is provided with public APIs (Application Program Interface) dedicated to SDK applications. One API is in C language provided by the VAS 157. The other API is in Java (registered trademark) language provided by the JSDK platform 155 described below. An SDK application created by using the API in C language is referred to as the CSDK application 153. An SDK application created by using the API in Java (registered trademark) language is referred to as the JSDK application 156. In FIG. 2, the CSDK application 153 is expressed by one block (rectangle), but there may be plural CSDK applications 153 installed in a single image forming apparatus 10.

The JVM 154 is a so-called Java (registered trademark) virtual machine, which is executed by interpreting instructions defined by Java (registered trademark) byte codes. In the present embodiment, the JVM 154 is installed as one of the CSDK applications.

The SAS 152 manages the life cycle of the CSDK application 153. For example, the SAS 152 controls an install process, an activation process, an abort process, and an uninstall process that are performed on the CSDK application 153.

The JSDK platform 155 provides an execution environment for the JSDK applications 156. That is to say, the JSDK platform 155 provides an API in Java (registered trademark) language to the JSDK applications 156. The JSDK platform 155 includes a JSDK management unit 1551 and a callback control unit 1552. The JSDK management unit 1551 manages the life cycle of the JSDK applications 156. For example, the JSDK management unit 1551 controls an install process, an activation process, an abort process, and an uninstall process that are performed on the JSDK applications 156. The JSDK management unit 1551 may be installed as one of the JSDK applications 156. The callback control unit 1552 controls a callback process. Callback corresponds to so-called callback in programming. That is to say, callback is a mechanism for generating callback to a corresponding report destination in response to an event being generated, by registering in advance the types of events and report destinations (callback function).

The OS 159 is a so-called operating system. The respective software items in the image forming apparatus 10 operate as processes or threads on the OS 159.

Figure 3:
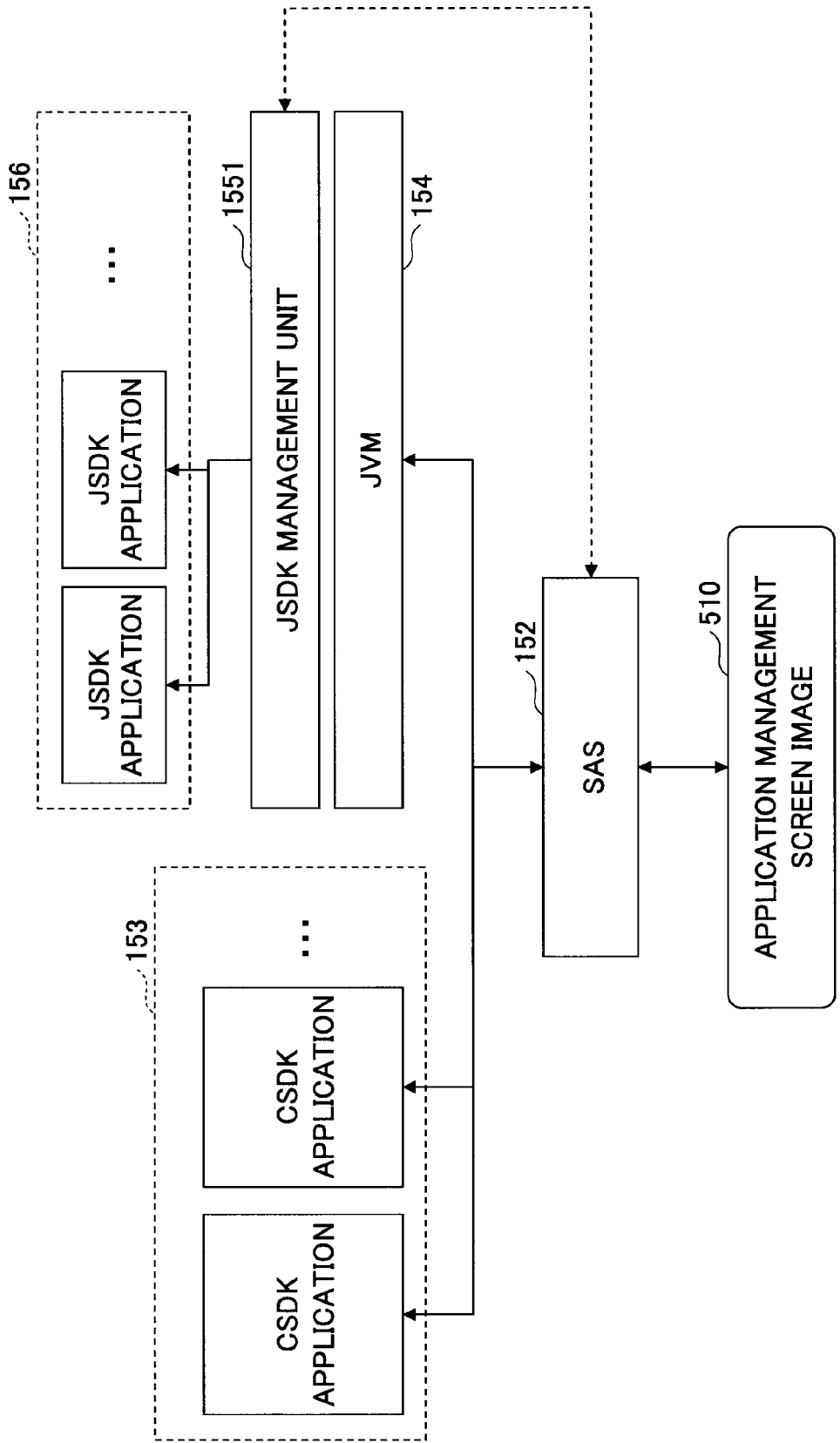
FIG. 3 illustrates an example of a management mechanism of JSDK applications and CSDK applications.

FIG. 3 illustrates an example of a management mechanism of JSDK applications 156 and CSDK applications 153. As shown in FIG. 3, the life cycles of the CSDK applications 153 are managed by the SAS 152. The respective CSDK applications 153 are activated as separate processes. The JVM 154 is one of the CSDK applications 153. Therefore, the JVM 154 is also activated as one process by the SAS 152.

Meanwhile, the life cycles of the JSDK applications 156 are managed by the JSDK management unit 1551. The respective JSDK applications 156 are activated as separate threads on processes of the JVM 154.

As described above, the CSDK applications 153 and the JSDK applications 156 have different management mechanisms because these applications have been developed in different languages. For example, if the SAS 152 attempts to directly control the JSDK application 156, the SAS 152 needs to call an interface in Java (registered trademark) language from source codes in C language. In this case, high-level programming techniques are necessary, and the processing contents are cumbersome and complicated. Furthermore, the CSDK application 153 is executed as a process, while the JSDK application 156 is executed as a thread. Also considering this difference in the execution format, it is advantageous in terms of simplifying the management mechanism to provide separate application management mechanisms for the CSDK applications 153 and the JSDK applications 156.

However, the user interfaces for the CSDK applications 153 and the JSDK application 156 are combined. Such a combined user interface is used by a user to instruct processes for installing, uninstalling, activating, and aborting applications. Specifically, an application management screen image 510 for providing the user interface is displayed on the operations panel 15 in an integrated fashion. When the CSDK application 153 is set as an operation target in the application management screen image 510, the SAS 152 directly executes a process in response to the operated instruction (for example, an install process, an uninstall process, an activation process, and an abort process). Meanwhile, when the JSDK application 156 is set as an operation target in the application management screen image 510, the SAS 152 reports an operation instruction to the JSDK management unit 1551. In response to a report from the SAS 152, the JSDK management unit 1551 executes a process in response to the operated instruction (for example, an install process, an uninstall process, an activation process, and an abort process).

Interactions between the SAS 152 and the JSDK management unit 1551 may be performed according a protocol that can be easily used regardless of the development language, such as HTTP (HyperText Transfer Protocol) and SOAP (Simple Object Access Protocol). Accordingly, there is no need to call an interface in Java (registered trademark) language from source codes in C language, and therefore there is no need for complicated processing contents.

A description is given of a configuration example of an SDK application that is an install target, according to a first embodiment. In the first embodiment, an SDK application is set as an install target, in which the CSDK application 153 and the JSDK application 156 are simply mixed. "Simply" means that the SDK application in which the CSDK application 153 and the JSDK application 156 are mixed is not created for the purpose of installing the SDK application as a single SDK application.

Figure 4:
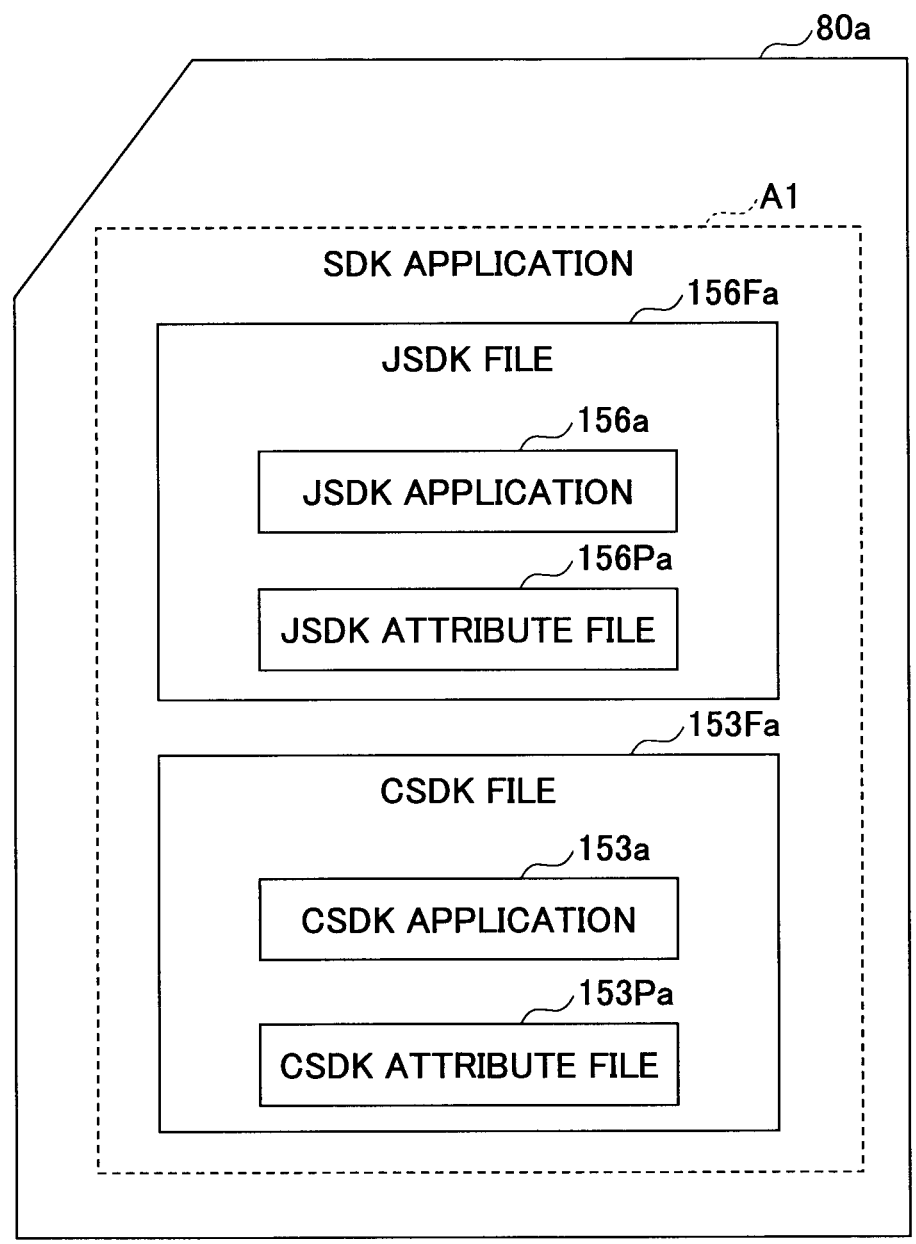
FIG. 4 illustrates an example of a configuration of an SDK application set as an install target according to a first embodiment.

FIG. 4 illustrates an example of a configuration of an SDK application set as an install target according to the first embodiment.

As shown in FIG. 4, an SDK application A1 includes a JSDK file 156Fa and a CSDK file 153Fa. The JSDK file 156Fa is a single archive file (for example, a JAR (Java (registered trademark) archive) file) including a JSDK application 156a and a JSDK attribute file 156Pa. The JSDK application 156a is an entity of the JSDK application 156 in the SDK application A1. The JSDK attribute file 156Pa includes configuration information of the JSDK file 156Fa and attribute information relevant to the JSDK application 156a (for example, an identifier (application identifier) of the JSDK application 156a).

The CSDK file 153Fa is a single archive file including a CSDK application 153a and a CSDK attribute file 153Pa. The CSDK application 153a is an entity of the CSDK application 153 in the SDK application A1. The CSDK attribute file 153Pa includes configuration information of the CSDK file 153Fa and attribute information relevant to the CSDK application 153a (for example, an identifier (application identifier) of the CSDK application 153a).

The JSDK application 156a is the JSDK application 156 that implements predetermined functions by using the CSDK application 153a. That is to say, in the SDK application A1, the CSDK application 153a is positioned as a single program module. The JSDK application 156a may call a method of the CSDK application 153a by using, for example, JNI (Java (registered trademark) Native Interface).

In FIG. 4, the SDK application A1 is recorded in the SD card 80a. In this case, the JSDK file 156Fa and the CSDK file 153Fa are recorded in the SD card 80a as separate files. That is to say, in FIG. 4, the rectangle formed with dashed lines indicating the SDK application A1 corresponds to the logical and conceptual range of a single SDK application A1.

The following describes processing procedures for installing and uninstalling the SDK application A1 of FIG. 4 in the image forming apparatus 10.

Figure 5:
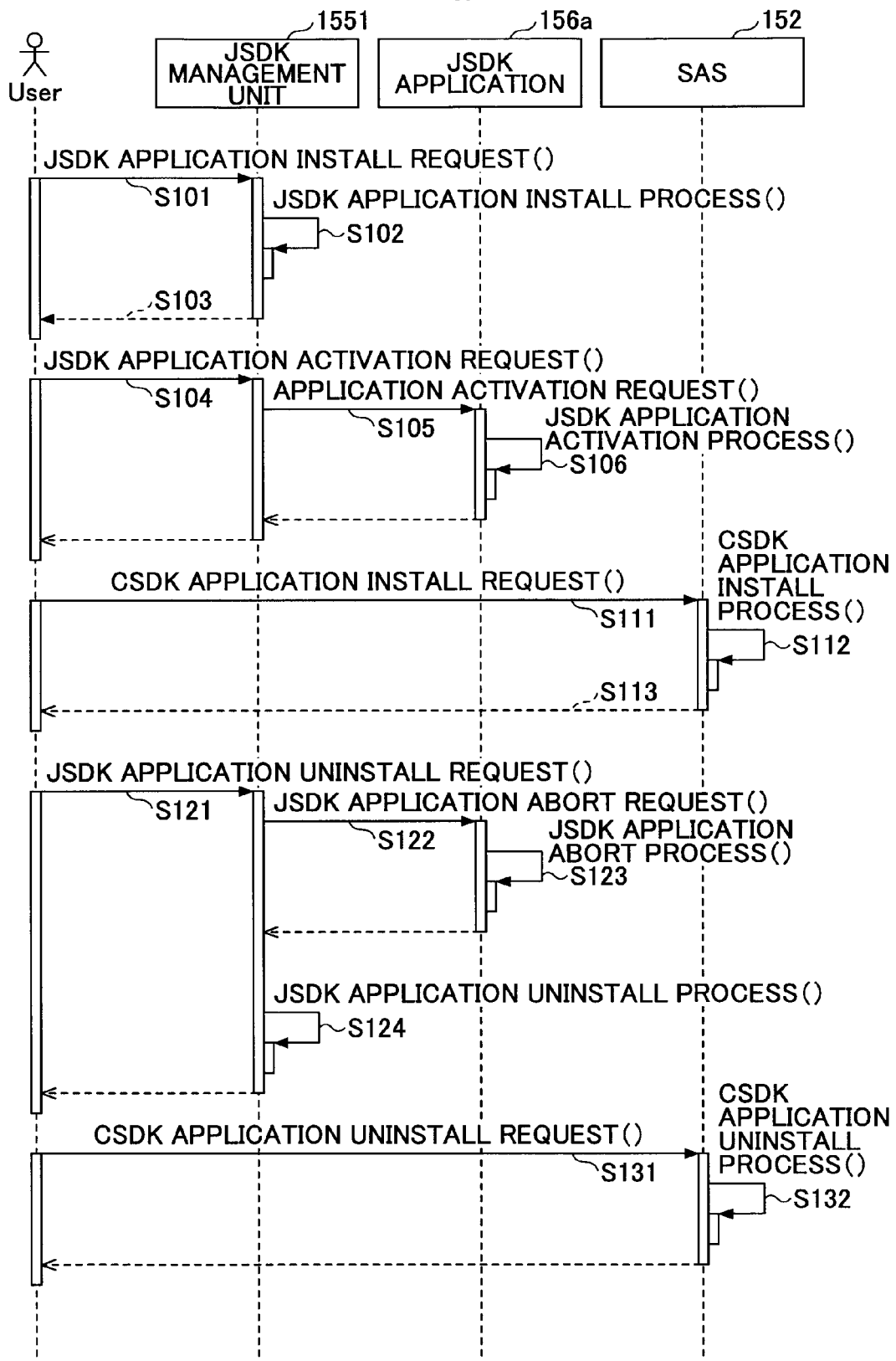
FIG. 5 is a sequence diagram for describing an example of processing procedures of an install process and an uninstall process of SDK applications according to the first embodiment.

FIG. 5 is a sequence diagram for describing an example of processing procedures of an install process and an uninstall process of SDK applications according to the first embodiment. Before starting the process of FIG. 5, the SD card 80a is inserted in the SD card slot 17. A main screen image, which is one of the application management screen images 510, is displayed on the operations panel 15 by the SAS 152.

In the main screen image, when the user selects to execute install, the SAS 152 causes the operations panel 15 to display an install screen image. The install screen image includes a selection list of SDK applications, in which the JSDK application 156a and the CSDK application 153a are indicated in separate rows. The selection list is created based on the JSDK attribute file 156Pa included in the JSDK file 156Fa in the SD card 80a, and the CSDK attribute file 153Pa included in the CSDK file 153Fa in the SD card 80a. The install screen image is one of the application management screen images 510.

In step S101, the user selects a row including the JSDK application 156a in the install screen image, and enters an instruction to execute install in the install screen image. The instruction to execute install is reported to the JSDK management unit 1551 via the SAS 152. In FIG. 5, the route via the SAS 152 is not shown.

Next, the JSDK management unit 1551 executes an install process of the JSDK application 156a (step S102). Specifically, the JSDK file 156Fa is read from the SD card 80a and expanded. Furthermore, an entry including the application identifier of the JSDK application 156a is added to the install information of the JSDK applications 156 managed by the JSDK platform 155 with the use of a predetermined recording medium (list information of installed JSDK applications 156). Furthermore, the JSDK application 156a and the JSDK attribute file 156Pa are copied to a predetermined storage area (hereinafter, "JSDK install area"). When the install process ends, the JSDK management unit 1551 sends a response to the SAS 152 indicating that the install process has ended. According to this response, the fact that the install process has ended is reported to the user by the SAS 152 via the install screen image (step S103).

Next, when the user selects to execute activation in the main screen image, the SAS 152 causes the operations panel 15 to display an activation screen image. The activation screen image includes a list of the CSDK applications 153 and the JSDK applications 156 included in install information of the CSDK applications 153 (list information of installed CSDK applications 153) or install information of the JSDK applications 156, which are managed with the use of the NVRAM 115. The SAS 152 acquires install information of the JSDK application 156 by referring to the JSDK management unit 1551. The activation screen image is one of the application management screen images 510.

The user selects a row including the JSDK application 156a included in the activation screen image, and enters an activation instruction in the activation screen image (step S104). The activation instruction is reported to the JSDK management unit 1551 via the SAS 152.

Next, the JSDK management unit 1551 enters a request to activate the JSDK application 156a (step S105). In response to the activation request, the JSDK application 156a is activated as a thread on the JVM 154 (step S106).

Next, in response to an instruction from the user, the SAS 152 causes the operations panel 15 to display the install screen image once again. The user selects a row including CSDK application 153a in the install screen image, and enters an instruction to execute install in the install screen image (step S111). Next, the SAS 152 executes the process of installing the CSDK application 153a (step S112). Specifically, the CSDK file 153Fa is read from the SD card 80a and expanded. Furthermore, an entry including the application identifier of the CSDK application 153a is added to the install information of the CSDK applications 153 managed with the use of the NVRAM 115. Furthermore, the CSDK application 153a and the CSDK attribute file 153Pa are copied to a predetermined storage area (hereinafter, "CSDK install area").

When the install process ends, the SAS 152 sends a report indicating that the install process has ended to the user via the install screen image (step S113).

When the SDK application A1 becomes unnecessary, the user selects to execute uninstall in the main screen image. The SAS 152 causes the operations panel 15 to display an uninstall screen image. The uninstall screen image includes a list of the CSDK applications 153 and the JSDK applications 156 included in the install information of the CSDK applications 153 or the install information of the JSDK applications 156. The uninstall screen image is one of the application management screen images 510.

The user selects a row of the JSDK application 156a included in the uninstall screen image, and enters an uninstall instruction via the uninstall screen image (step S121). The uninstall instruction is reported to the JSDK management unit 1551 via the SAS 152.

In response to the uninstall instruction, the JSDK management unit 1551 enters a request to abort the JSDK application 156a (step S122). In response to the abort request, the thread relevant to the JSDK application 156a ends (step S123). Next, the JSDK management unit 1551 executes a process to uninstall the JSDK application 156a (step S124). For example, the entry of the JSDK application 156a is deleted from the install information of the JSDK applications 156 managed by the JSDK platform 155. Furthermore, the JSDK application 156a and the JSDK attribute file 156Pa that have been copied to the JSDK install area are deleted.

Next, the user selects a row including the CSDK application 153a in the uninstall screen image, and enters an instruction to execute uninstall in the uninstall screen image (step S131). In response to the uninstall instruction, the SAS 152 executes a process to uninstall the CSDK application 153a (step S132). For example, an entry relevant to the CSDK application 153a is deleted from the install information of the CSDK applications 153 that is managed with the use of the NVRAM 115. Furthermore, the CSDK application 153a and the CSDK attribute file 153Pa that have been copied to the CSDK install area are deleted.

As described above, in the first embodiment, although there is only a single SDK application A1, the install operation and the uninstall operation respectively require two steps (i.e., steps S101 and S111, and steps S121 and S131).

Figure 6:
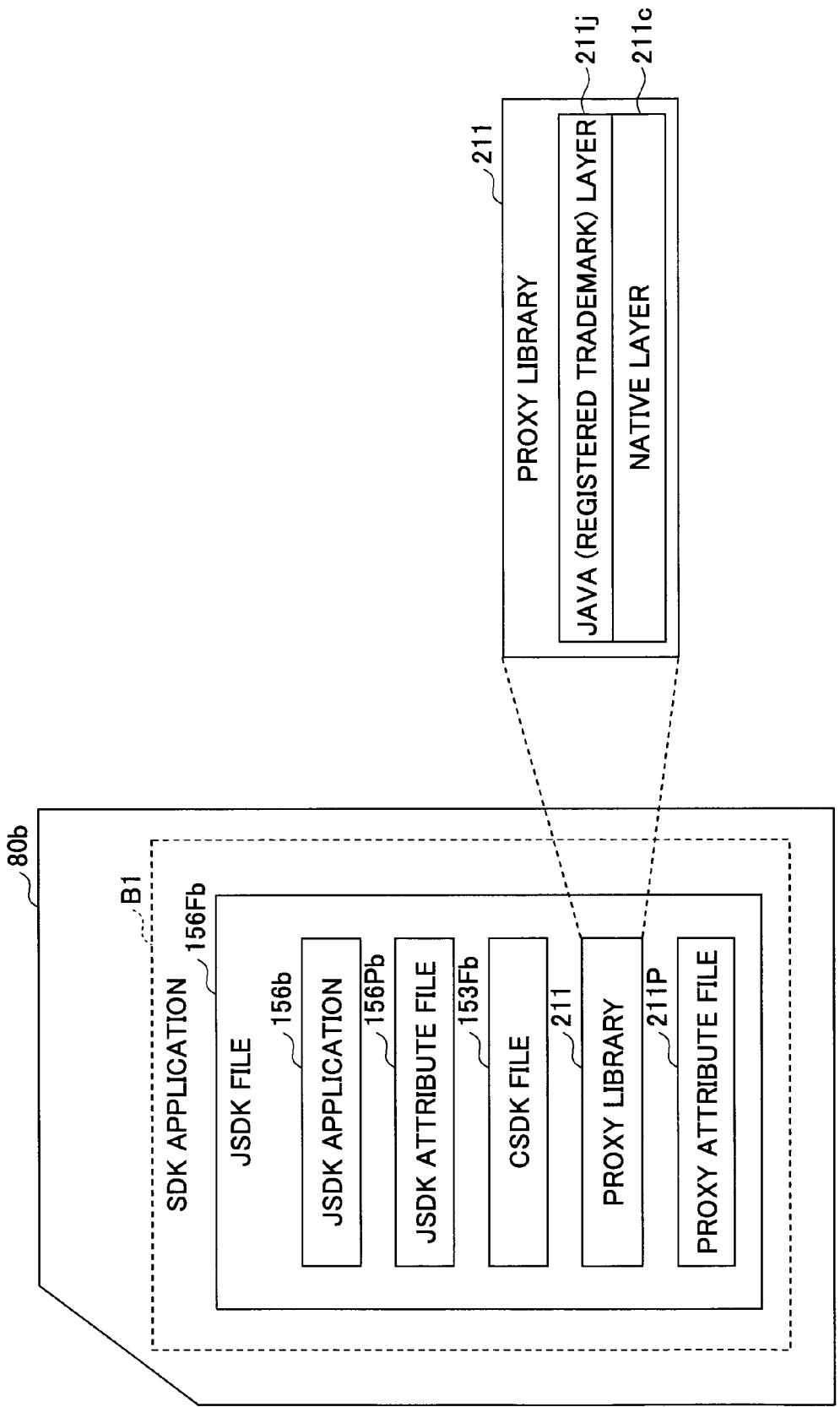
FIG. 6 illustrates an example of a configuration of an SDK application set as an install target according to a second embodiment.

In order to address such redundancy, in a second embodiment, the SDK application is configured as indicated in FIG. 6.

FIG. 6 illustrates an example of a configuration of an SDK application set as an install target according to the second embodiment.

As shown in FIG. 6, an SD card 80b has one JSDK file 156Fb recorded as an SDK application B1. The JSDK file 156Fb is an archive file (for example, a JAR file) including a JSDK application 156b, a JSDK attribute file 156Pb, a CSDK file 153Fb, a proxy library 211, and a proxy attribute file 211P.

The JSDK application 156b is an entity of the JSDK application 156 in the SDK application B1. The JSDK attribute file 156Pb includes configuration information of the JSDK file 156Fb and attribute information relevant to the JSDK application 156b (for example, an application identifier of the JSDK application 156b).

The CSDK file 153Fb is an archive file having a configuration similar to that of the CSDK file 153Fa shown in FIG. 4. That is to say, the CSDK file 153Fb includes a CSDK application 153b (not shown) that is an entity of the CSDK application 153 in the SDK application B1 and a CSDK attribute file 153Pb (not shown) including configuration information of the CSDK file 153Fb and attribute information relevant to the CSDK application 153b (for example, an application identifier of the CSDK application 153b).

As described above, in the second embodiment, the CSDK application 153b is stored in the JAR file of the JSDK application 156b.

In the second embodiment, the dependency relationship between the JSDK application 156b and the CSDK application 153b is the same as the dependency relationship between the JSDK application 156a and the CSDK application 153a in the first embodiment. That is to say, the JSDK application 156b uses the CSDK application 153b as a single program module.

The proxy library 211 is a program module (library) that executes an install process and an uninstall process on the CSDK application 153b. As shown in FIG. 6, the proxy library 211 includes a Java (registered trademark) layer 211j and a native layer 211c. The Java (registered trademark) layer 211j is for providing an interface (method, etc.) for the JSDK application 156b, and is implemented in Java (registered trademark) language. In the native layer 211c, algorithms of the install process and the uninstall process are implemented in C language. That is to say, in the proxy library 211, essential functions are implemented in C language, and the parts that are implemented in C language are wrapped by Java (registered trademark). The essential functions of the proxy library 211 are implemented in C language for the following reason. That is, the proxy library 211 needs to access the NVRAM 115, but it is difficult to implement the function of accessing the NVRAM 115 in Java (registered trademark) language. Furthermore, the proxy library 211 includes the Java (registered trademark) layer 211j for the purpose of facilitating the operation of using (calling) the proxy library 211 performed by the JSDK application 156b. For example, the proxy library 211 is included in the JSDK application 156b as a single JAR file.

The proxy attribute file 211P includes information necessary for the operation of installing the CSDK application 153b performed by the proxy library 211.

Figure 7:
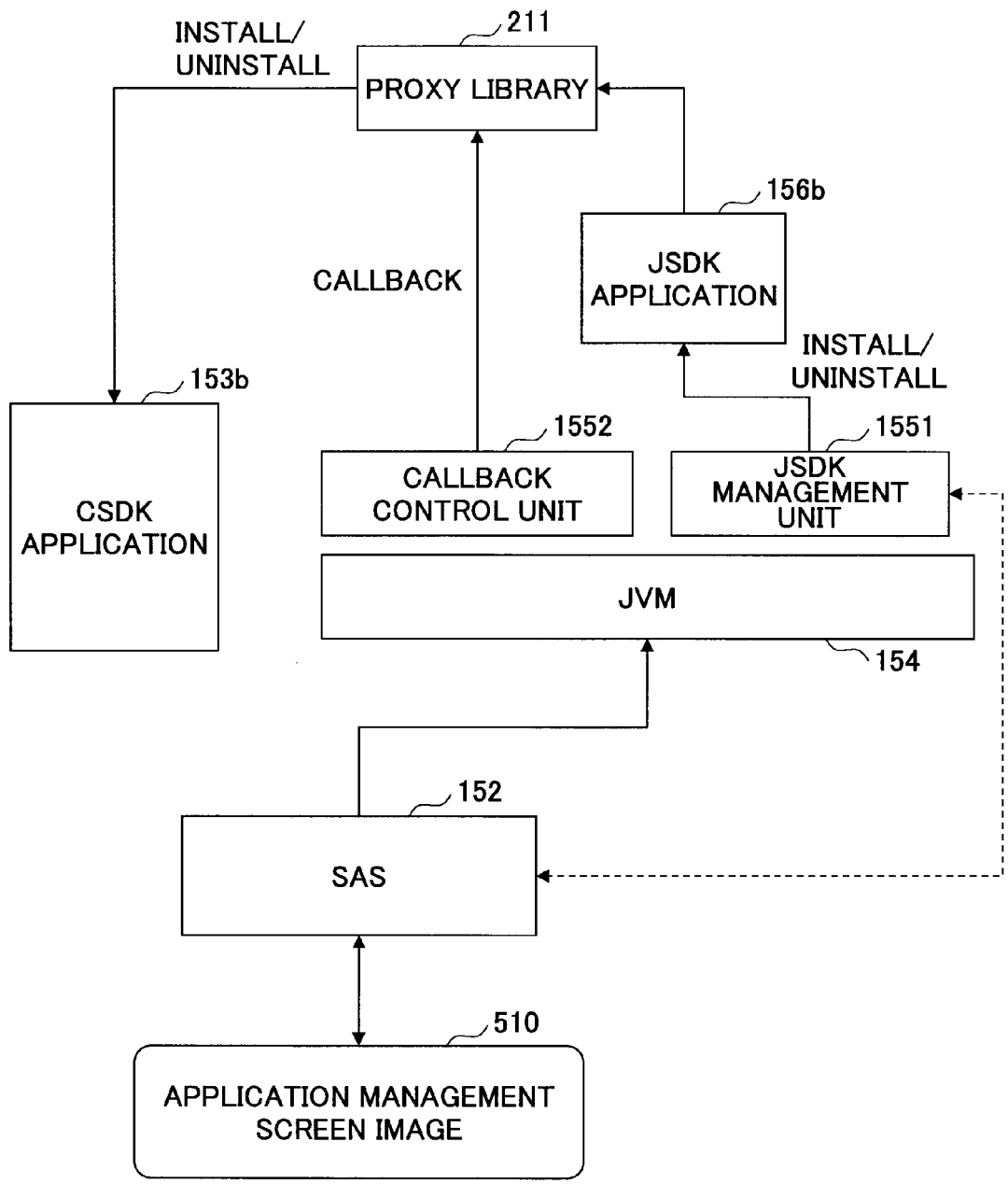
FIG. 7 illustrates an example of an install mechanism relevant to the SDK application including a proxy library.

A description is given of an install mechanism of the image forming apparatus 10, relevant to the SDK application including the proxy library 211. FIG. 7 illustrates an example of an install mechanism relevant to the SDK application including the proxy library 211.

As shown in FIG. 7, the operation of installing the JSDK application 156b is performed in the same manner as that of the first embodiment. That is to say, an instruction entered in the application management screen image 510 is reported from the SAS 152 to the JSDK management unit 1551. In response to the reported instruction, the JSDK management unit 1551 installs or uninstalls the JSDK application 156b.

The installed JSDK application 156b calls the proxy library 211 when activated. In response to the call, the proxy library 211 executes the process of installing the CSDK application 153b on behalf of the SAS 152.

When the JSDK application 156b is uninstalled, this effect is called back (reported) to the proxy library 211 by the callback control unit 1552. The proxy library 211 detects that the JSDK application 156b has been uninstalled based on the callback. In response to the uninstall being detected, the proxy library 211 executes the process of uninstalling the CSDK application 153b on behalf of the SAS 152.

As described above, in the SDK application B1 including the proxy library 211, the proxy library 211 performs the install process and the uninstall process on the CSDK application 153b, on behalf of the SAS 152.

A description is given of processing procedures of installing and uninstalling the SDK application B1 shown in FIG. 6 in the image forming apparatus 10.

Figure 8:
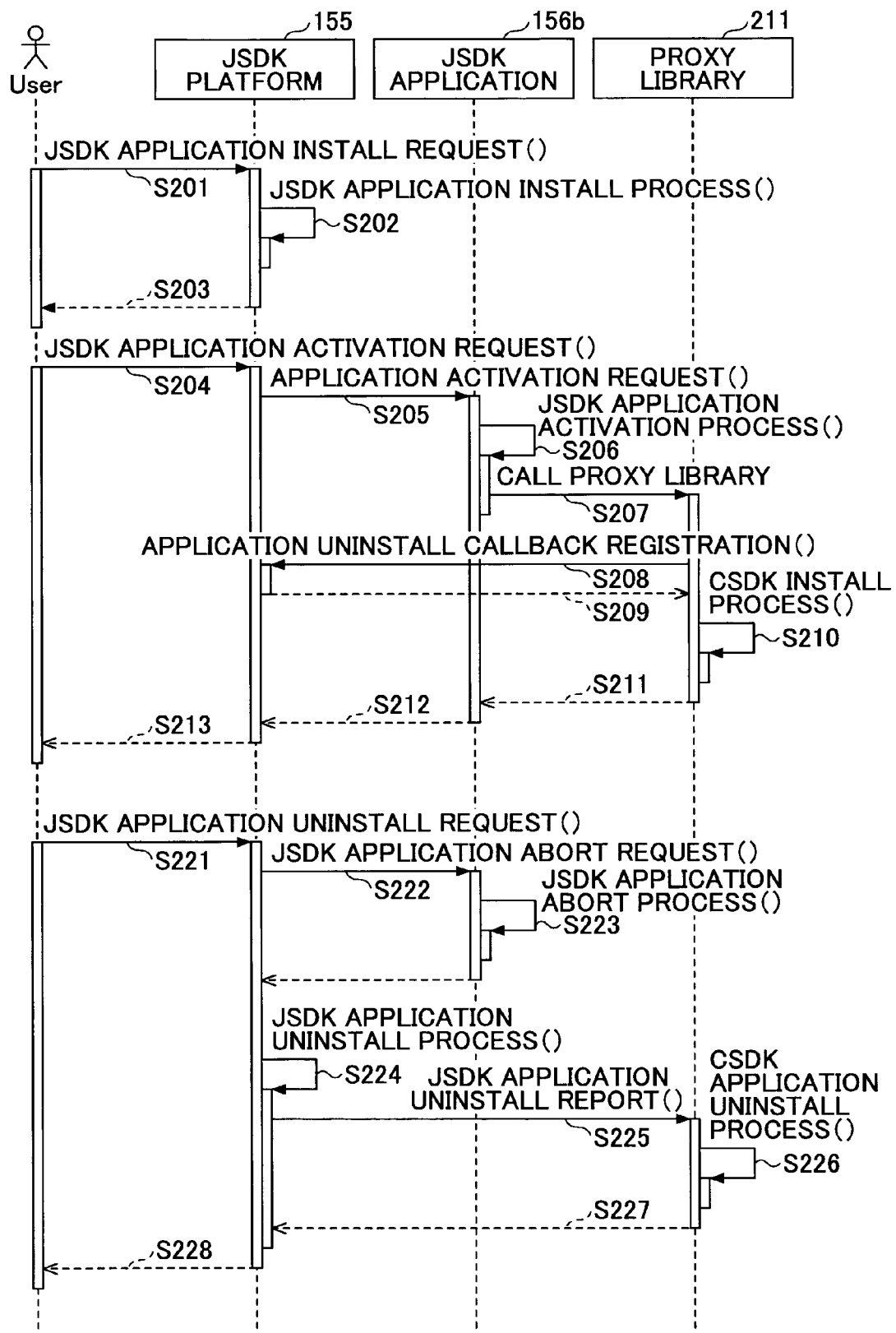
FIG. 8 is a sequence diagram for describing an example of processing procedures of an install process and an uninstall process of SDK applications according to a second embodiment.

FIG. 8 is a sequence diagram for describing an example of processing procedures of an install process and an uninstall process of SDK applications according to the second embodiment. Before starting the process of FIG. 8, the SD card 80b of FIG. 6 is inserted in the SD card slot 17. A main screen image, which is one of the application management screen images 510, is displayed on the operations panel 15 by the SAS 152.

In the main screen image, when the user selects to execute install, the SAS 152 causes the operations panel 15 to display an install screen image including a row including the JSDK application 156b as the selection candidate. The install screen image is created based on the JSDK attribute file 156Pb included in the JSDK file 156Fb in the SD card 80b.

In step S201, the user selects a row including the JSDK application 156b in the install screen image, and enters an instruction to execute install in the install screen image. The instruction to execute install is reported to the JSDK management unit 1551 via the SAS 152. In FIG. 8, the route via the SAS 152 is not shown.

Next, the JSDK management unit 1551 executes an install process of the JSDK application 156b (step S202). Specifically, the JSDK file 156Fb is read from the SD card 80b and expanded. Furthermore, an entry including the application identifier of the JSDK application 156b is added to the install information of the JSDK applications 156 managed by the JSDK platform 155 with the use of a predetermined recording medium. Furthermore, the JSDK application 156b, the JSDK attribute file 156Pb, the CSDK file 153Fb, the proxy library 211, and the proxy attribute file 211P are copied to the JSDK install area. The CSDK file 153Fb, the proxy library 211, and the proxy attribute file 211P are recognized by the JSDK management unit 1551 as resource files of the JSDK application 156b. Thus, the JSDK management unit 1551 does not execute any special process on the CSDK file 153Fb, the proxy library 211, or the proxy attribute file 211P. However, the install operation of the proxy library 211 can be completed by saving the proxy library 211 as a resource file of the JSDK application 156b. That is to say, the operation of installing the proxy library 211 is performed in association with the operation of installing the JSDK application 156b (i.e., the proxy library 211 is installed together with the JSDK application 156b).

When the install process ends, the JSDK management unit 1551 sends a response to the SAS 152 indicating that the install process has ended. According to this response, the fact that the install process has ended is reported to the user by the SAS 152 via the install screen image (step S203).

Next, when the user selects to execute activation in the main screen image, the SAS 152 causes the operations panel 15 to display an activation screen image. The activation screen image includes a list of the CSDK applications 153 and the JSDK applications 156 included in install information of the CSDK application 153 or install information of the JSDK applications 156.

The user selects a row including the JSDK application 156a included in the activation screen image, and enters an activation instruction in the activation screen image (step S204). The activation instruction is reported to the JSDK management unit 1551 via the SAS 152.

Next, the JSDK management unit 1551 enters a request to activate the JSDK application 156b (step S205). In response to the activation request, the JSDK application 156b is activated as a thread on the JVM 154 (step S206). The JSDK application 156b loads the proxy library 211 in the RAM 112, and calls a predetermined method (or function) in the Java (registered trademark) layer 211j of the loaded proxy library 211 (step S207). That is to say, the proxy library 211 receives a call from the JSDK application 156a. In response to the proxy library 211 being loaded in the RAM 112, the proxy attribute file 211P is also loaded in the RAM 112.

In response to the call, the proxy library 211 registers, in the callback control unit 1552 of the JSDK platform 155, callback information used for sending a report indicating that the JSDK application 156b has been uninstalled to the proxy library 211 (step S208). That is to say, "JSDK application 156b uninstalled" is specified as an event, and a request is made to register callback information in which a predetermined method of the proxy library 211 is specified as the report destination (callback function). The callback control unit 1552 stores the callback information by using, for example, the RAM 112, and sends a response to the proxy library 211 reporting that the callback information has been registered (step S209).

Next, the native layer 211c of the proxy library 211 executes the process of installing the CSDK application 153b, based on the CSDK file 153Fb (step S210). Details of the install process are described below. After the install process has ended, the Java (registered trademark) layer 211j of the proxy library 211 sends, to the JSDK application 156b that is the call source, a response indicating results of the install process (step S211). Next, the JSDK application 156b returns the function of controlling processes to the JSDK management unit 1551 (step S212). The JSDK management unit 1551 reports, to the SAS 152, that the JSDK application 156b has been activated. In response to the report, the SAS 152 displays a message on the activation screen image that the JSDK application 156b has been activated (step S213).

As described above, in the second embodiment, in response to the JSDK application 156b being activated, the proxy library 211 automatically executes the operation of installing the CSDK application 153b.

When the SDK application B1 becomes unnecessary, the user selects to execute uninstall in the main screen image. The SAS 152 causes the operations panel 15 to display an uninstall screen image. The uninstall screen image includes a list of the CSDK applications 153 and the JSDK applications 156 included in the install information of the CSDK applications 153 or the install information of the JSDK applications 156.

The user selects a row of the JSDK application 156b included in the uninstall screen image, and enters an uninstall instruction via the uninstall screen image (step S221). The uninstall instruction is reported to the JSDK management unit 1551 via the SAS 152.

In response to the uninstall instruction, the JSDK management unit 1551 enters a request to abort the JSDK application 156b (step S222). In response to the abort request, the thread relevant to the JSDK application 156a ends (step S223). Next, the JSDK management unit 1551 executes a process to uninstall the JSDK application 156b (step S224). For example, the entry of the JSDK application 156b is deleted from the install information of the JSDK applications 156 managed by the JSDK platform 155. Furthermore, the JSDK application 156b, the JSDK attribute file 156Pb, the CSDK file 153Fb, the proxy library 211, and the proxy attribute file 211P that have been copied to the JSDK install area are deleted.

Next, in response to the JSDK application 156b being uninstalled, the callback control unit 1552 of the JSDK platform 155 calls a callback function specified in the callback information registered at step S208 (step S225). The callback function is a predetermined method of the Java (registered trademark) layer 211j of the proxy library 211. Thus, the predetermined method is called. As a result, it is reported to the proxy library 211 that the JSDK application 156b has been uninstalled. In step S224, the module file of the proxy library 211 is deleted; however, the contents of the module file and the proxy attribute file 211P are loaded in the RAM 112. Next, the native layer 211c of the proxy library 211 executes the process of uninstalling the CSDK application 153b (step S226).

After the uninstall process, the Java (registered trademark) layer 211j of the proxy library 211 returns the function of controlling processes to the callback control unit 1552 that is the call source (step S227). Next, the JSDK management unit 1551 reports to the SAS 152 that the JSDK application 156b has been uninstalled. In response to the report, the SAS 152 causes the uninstall screen image to display the effect that the JSDK application 156b has been uninstalled (step S228).

As described above, in the second embodiment, in response to the JSDK application 156b being uninstalled, the proxy library 211 automatically executes the process of uninstalling the CSDK application 153b.

Figure 9:
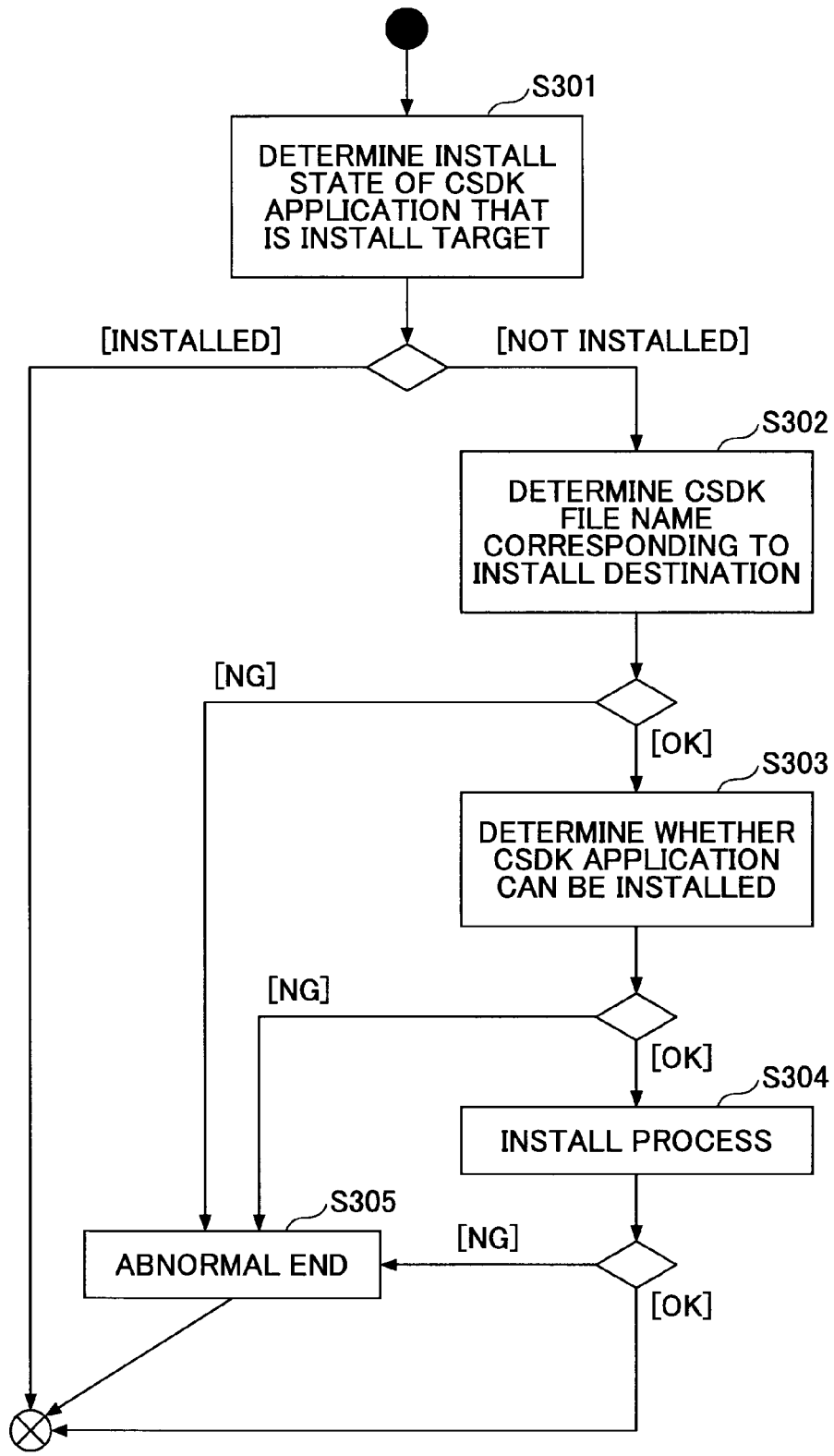
FIG. 9 is for describing an example of processing procedures of a process of installing a CSDK application performed by the proxy library.

Next, a description is given of details of step S210 in FIG. 8. FIG. 9 is for describing an example of processing procedures of a process of installing a CSDK application performed by the proxy library 211. In the description of FIG. 9, the native layer 211c of the proxy library 211 is referred to as the proxy library 211.

In step S301, the proxy library 211 determines whether the CSDK application 153b that is the install target is already installed in the image forming apparatus 10. The determination is made by comparing or cross-checking the proxy attribute file 211P with the install information of the CSDK applications 153 managed with the use of the NVRAM 115.

FIG. 10 indicates an example of information recorded in the proxy attribute file 211P. As shown in FIG. 10, in the proxy attribute file 211P, the model name, the application identifier, and the CSDK file name are recorded for each model of the image forming apparatus 10 into which the CSDK application 153b can be installed.

The model name is the name of the model of the image forming apparatus 10. The application identifier is the identifier of the CSDK application 153b. Even when the same function is implemented by two CSDK applications 153b, different application identifiers are given to these two CSDK applications 153b if the contents of the files are different depending on the model type. The CSDK file name is the name of the CSDK file 153Fb. FIG. 10 shows an example in which a common CSDK file 153Fb is applicable to different model types. Therefore, a common application identifier corresponds to different model types.

When different CSDK files 153Fb are to be applied according to the model type, the application identifiers and CSDK file names are different. In this case, the JSDK file 156Fb includes plural CSDK files 153Fb.

In step S301, it is determined whether a particular application identifier is included in install information of the CSDK applications 153 managed with the use of the NVRAM 115. Specifically, the particular application identifier means the same application identifier as the application identifier in the proxy attribute file 211P associated with the model name of the image forming apparatus 10 that is the install destination. When the corresponding application identifier is included in the install information of the CSDK applications 153, the proxy library 211 determines that the CSDK application 153b is already installed, and normally ends the process of FIG. 9. Thus, in this case, the process of installing the CSDK application 153b is not executed.

When the corresponding application identifier is not included in the install information of the CSDK applications 153, the proxy library 211 determines that the CSDK application 153b is not yet installed. Next, the proxy library 211 determines the CSDK file name corresponding to the model name of the image forming apparatus 10 that is the install destination, based on the proxy attribute file 211P (step S302).

When the CSDK file name corresponding to the model name of the image forming apparatus 10 that is the install destination is not recorded in the proxy attribute file 211P, the proxy library 211 abnormally ends the process of FIG. 9 (step S305). Abnormally ending the process means to return, to the JSDK application 156b, a report indicating that the install process is unsuccessful.

When the CSDK file name corresponding to the model name of the image forming apparatus 10 that is the install destination is recorded in the proxy attribute file 211P, the proxy library 211 determines whether the CSDK application 153b can be installed (step S304). For example, when there is an upper limit in the number of CSDK applications 153 that can be installed, or when there are any other limitations, it is determined whether the CSDK application 153b can be installed based on whether these upper limits or limitations may be exceeded by installing the CSDK application 153b.

When it is determined that the CSDK application 153b cannot be installed, the proxy library 211 abnormally ends the process of FIG. 9 (step S305). When it is determined that the CSDK application 153b can be installed, the proxy library 211 executes the process of installing the CSDK application 153b, based on the CSDK file 153Fb relevant to the CSDK file name determined in step S302 (step S304). Specifically, the CSDK attribute file 153Pb saved in the JSDK install area in step S202 of FIG. 8 is expanded, and the CSDK application 153b and the CSDK attribute file 153Pb are saved in the CSDK install area. Furthermore, an entry including an application identifier of the CSDK application 153b is added to the install information of the CSDK applications 153 managed with the use of the NVRAM 115.

When the install process is unsuccessful (for example, when the process of saving the CSDK application 153b in the CSDK install area or the process of adding install information is unsuccessful), the proxy library 211 abnormally ends the process of FIG. 9.

Figure 11:
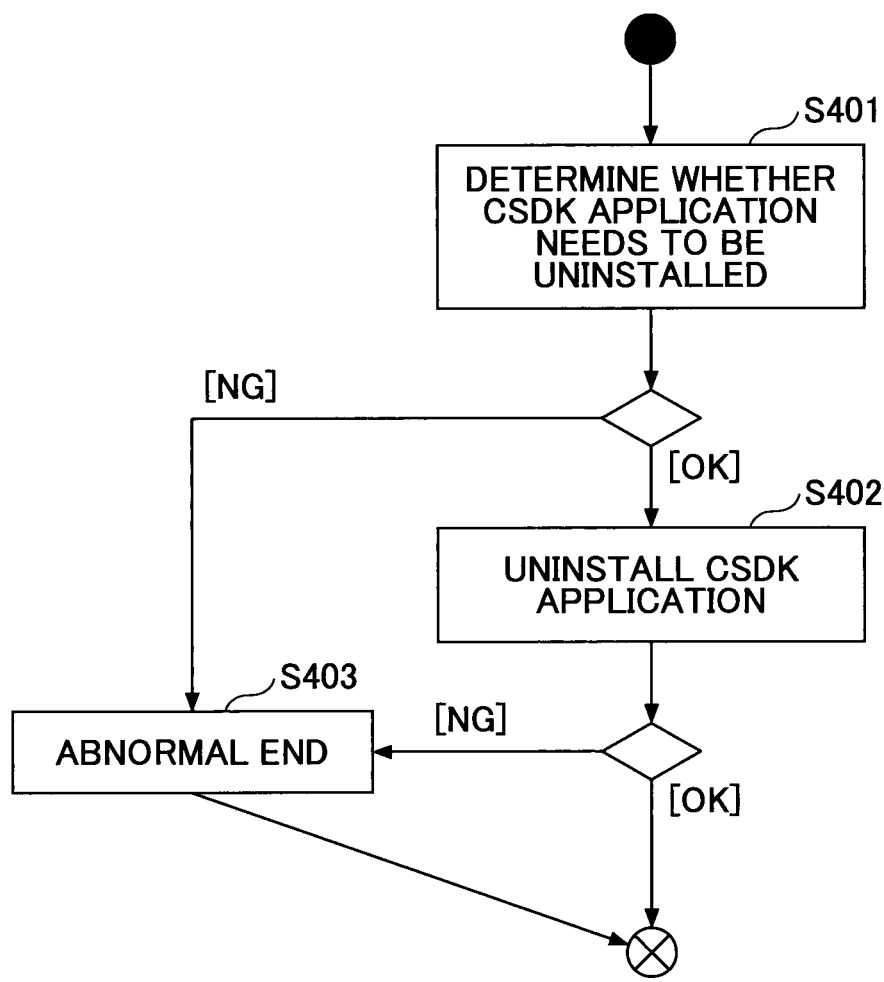
FIG. 11 is for describing an example of processing procedures of a process of uninstalling the CSDK application performed by the proxy library.

Next, a detailed description is given of step S226 in FIG. 8. FIG. 11 is for describing an example of processing procedures of a process of uninstalling the CSDK application 153 performed by the proxy library 211. In the description of FIG. 11, the native layer 211c of the proxy library 211 is referred to as the proxy library 211.

In step S401, the proxy library 211 determines whether the CSDK application 153b needs to be uninstalled. Specifically, for example, it is determined whether a particular application identifier is included in install information of the CSDK applications 153 managed with the use of the NVRAM 115. Specifically, a particular application identifier means an application identifier of the CSDK application 153b that is an uninstall target specified in the factor of a callback function called in step S225. That is to say, it is determined whether an uninstall process is necessary based on whether the CSDK application 153b is installed.

When it is determined that an uninstall process is unnecessary (when the CSDK application 153b is not installed), the proxy library 211 abnormally ends the process of FIG. 11 (step S403). When it is determined that an uninstall process is necessary (when the CSDK application 153b is installed), the proxy library 211 executes a process of uninstalling the CSDK application 153b (step S402). For example, the entry of the CSDK application 153b is deleted from the install information of the CSDK applications 153 managed with the use of the NVRAM 115. Furthermore, the CSDK application 153b and the CSDK attribute file 153Pb that have been copied to the CSDK install area are deleted.

When the uninstall process is unsuccessful (for example, when the process of deleting the entry from the install information or the process of deleting the CSDK application 153b is unsuccessful), the proxy library 211 abnormally ends the process of FIG. 11 (step S403).

As described above, according to the present embodiment, when the JSDK application 156b is activated, the proxy library 211 automatically executes the process of installing the CSDK application 153b. Furthermore, when uninstalling the JSDK application 156b, the proxy library 211 automatically executes the process of uninstalling the CSDK application 153b.

Thus, the user does not need to perform an operation for installing the CSDK application 153b.

Furthermore, the logic of installing or uninstalling the CSDK application 153b is installed in the proxy library 211 which is distributed together with the JSDK application 156b (included in the JSDK file 156Fb as part of the JSDK application 156b). That is to say, the logic does not need to be installed in an existing part of the install mechanism of the image forming apparatus 10 (such as the SAS 152 and the JSDK management unit 1551). Accordingly, there is no need to make corrections on existing parts of the install mechanism of the image forming apparatus 10.

Furthermore, the CSDK application 153b (CSDK file 153Fb) is included in the JSDK file 156Fb as part of the JSDK application 156b. Therefore, the SAS 152 can display the install target as one JSDK application 156b, on the install screen image. The JSDK management unit 1551 can take in (save) the CSDK application 153b (CSDK file 153Fb) in the image forming apparatus 10, by the same process as the process of installing the JSDK application 156a described with reference to FIG. 5.

In the present embodiment, a description is made of an example of simplifying the process of installing the JSDK application 156 and the CSDK application 153. However, the programming languages of the programs to be combined do not necessarily need to be different. Furthermore, the present application may also be applied to a case of combining three or more programs. Specifically, two or more types of JSDK applications 156 and two or more types of CSDK applications 153 may be included in the JSDK file 156Fb.

According to an embodiment of the present invention, the operation of installing programs can be simplified.

The present invention is not limited to the specific embodiments described herein, and variations and modifications may be made without departing from the scope of the present invention.

The present application is based on Japanese Priority Application No. 2010-208213 filed on Sep. 16, 2010 with the Japan Patent Office, the entire contents of which are hereby incorporated by reference.

The invention claimed is:

1. A non-transitory computer-readable storage medium with an executable install program stored therein, wherein the executable install program instructs a processor of an apparatus to execute:

receiving a call from a first program executable on the apparatus when the first program is activated;

checking stored attribute information that indicates a correspondence between multiple apparatus types and multiple programs;

identifying a second program that corresponds to the apparatus based on the checked attribute information; and in response to the call, installing the second program that is used by the first program, and setting, in the apparatus, callback information used for sending, to the executable install program, a report indicating that the first program has been uninstalled, wherein the first program and the second program are developed by different development languages, and when executing the first program, the first program is executed by calling a part of a plurality of program modules to be used, from the second program.

2. The non-transitory computer-readable storage medium according to claim 1, further comprising:

installing the executable install program in the apparatus in association with the first program.

3. The non-transitory computer-readable storage medium according to claim 1, further comprising:

uninstalling the second program in response to detecting that the first program has been uninstalled.

4. The non-transitory computer-readable storage medium according to claim 3, wherein the uninstalling of the second program includes uninstalling the second program in response to receiving the report indicating that the first program has been uninstalled based on the callback information.

5. An install method executed by an apparatus, the install method comprising:

receiving a call from a first program executable on the apparatus when the first program is activated;

checking stored attribute information that indicates a correspondence between multiple apparatus types and multiple programs;

identifying a second program that corresponds to the apparatus based on the checked attribute information; and in response to the call, installing the second program that is used by the first program, and setting, in the apparatus, callback information used for reporting that the first program has been uninstalled, wherein the first program and the second program are developed by different development languages, and when executing the first program, the first program is executed by calling a part of a plurality of program modules to be used, from the second program.

6. The install method according to claim 5, further comprising:

installing an install program in the apparatus in association with the first program, the install program causing the apparatus to execute the receiving of the call and the installing of the second program.

7. The install method according to claim 5, further comprising:

uninstalling the second program in response to detecting that the first program has been uninstalled.

8. The install method according to claim 7, wherein the uninstalling of the second program includes uninstalling the second program in response to detecting that the first program has been uninstalled based on the callback information.

9. An apparatus comprising:
a memory that stores a program; and
a processor, coupled to the memory, that executes the program,
wherein the program which, when executed by the processor, causes the apparatus to:
   receive a call from a first program executable on the apparatus when the first program is activated;
   check stored attribute information that indicates a correspondence between multiple apparatus types and multiple programs;
   identify a second program that corresponds to the apparatus based on the checked attribute information; and
   in response to the call, install the second program that is used by the first program, and set, in the apparatus, callback information used for reporting that the first program has been uninstalled,
wherein the first program and the second program are developed by different development languages, and when executing the first program, the first program is executed by calling a part of a plurality of program modules to be used, from the second program.

10. The apparatus according to claim 9, wherein the program further causes the apparatus to:
   install an install program in the apparatus in association with the first program, the install program causing the apparatus to receive the call from the first program and install the second program.

11. The apparatus according to claim 9, wherein the program further causes the apparatus to:
   uninstall the second program in response to detecting that the first program has been uninstalled.

12. The apparatus according to claim 11, wherein
the uninstall includes uninstalling the second program in response to detecting that the first program has been uninstalled based on the callback information.

13. The non-transitory computer-readable storage medium according to claim 1, wherein the first program is a JSDK application and the second program is a CSDK application, the JSDK application calling a proxy library including the stored attribute information that includes a model name, an application identifier of the CSDK application, and a CSDK file name recorded for each model of an image forming apparatus into which the CSDK application can be installed, and wherein the proxy library is included in the JSDK application as a single JAR file.

* * * * *